US011915635B2

(12) United States Patent
Li et al.

(10) Patent No.: US 11,915,635 B2
(45) Date of Patent: Feb. 27, 2024

(54) DIMMING METHOD AND DEVICE OF DISPLAY PANEL, STORAGE MEDIUM, AND TERMINAL EQUIPMENT

(71) Applicant: TCL CHINA STAR OPTOELECTRONICS TECHNOLOGY CO., LTD., Shenzhen (CN)

(72) Inventors: Ruixiong Li, Shenzhen (CN); Jinjia Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/771,482

(22) PCT Filed: Mar. 21, 2022

(86) PCT No.: PCT/CN2022/082023
§ 371 (c)(1),
(2) Date: Apr. 24, 2022

(87) PCT Pub. No.: WO2023/159705
PCT Pub. Date: Aug. 31, 2023

(65) Prior Publication Data

US 2023/0267868 A1 Aug. 24, 2023

(30) Foreign Application Priority Data

Feb. 24, 2022 (CN) ......................... 202210170470.7

(51) Int. Cl.
*G09G 5/10* (2006.01)
*G09G 3/20* (2006.01)

(52) U.S. Cl.
CPC ... *G09G 3/2007* (2013.01); *G09G 2320/0626* (2013.01)

(58) Field of Classification Search
CPC .. G09G 3/2007; G09G 3/2011; G09G 3/3614; G09G 3/3696; G09G 2320/0626;
(Continued)

(56) References Cited

U.S. PATENT DOCUMENTS 5,032,829 A * 7/1991 Shoji ........................ G09G 3/30 345/212
2011/0090262 A1* 4/2011 Kim ..................... G09G 3/3607 345/690
(Continued)

FOREIGN PATENT DOCUMENTS

CN 1366656 A 8/2002
CN 102332247 A 1/2012
(Continued)

OTHER PUBLICATIONS

Chinese Office Action issued in corresponding Chinese Patent Application No. 202210170470.7 dated Apr. 19, 2023, pp. 1-7, 17pp.

*Primary Examiner* — Jennifer T Nguyen
(74) *Attorney, Agent, or Firm* — The Roy Gross Law Firm, LLC; Roy Gross

(57) ABSTRACT

A dimming method and device of a display panel, a storage medium, and a terminal equipment are provided. In a second dimming stage in a frame of one frame of an image, a grayscale of a light-emitting stage of the display is controlled by the light-emitting signal. In a first dimming stage in the frame of the image, the grayscale of the light-emitting stage of the display panel is controlled by superposing a control signal in the light-emitting signal. Therefore, in a
(Continued)

low grayscale, the grayscale is realized by reducing an amplitude of the light-emitting signal.

15 Claims, 4 Drawing Sheets

(58) Field of Classification Search
CPC ... G09G 2320/0242; G09G 2320/0233; G09G 2320/043; G09G 2320/0633; G09G 2300/0809
USPC .......................................................... 345/691
See application file for complete search history.

(56) References Cited

U.S. PATENT DOCUMENTS

| | | | | |
|---|---|---|---|---|
| 2013/0207954 | A1 | 8/2013 | Choi | |
| 2014/0015870 | A1* | 1/2014 | Takahashi | G09G 3/3426 345/87 |

FOREIGN PATENT DOCUMENTS

| | | | | | |
|---|---|---|---|---|---|
| CN | 104103235 | A | | 10/2014 | |
| CN | 111210778 | A | | 5/2020 | |
| CN | 112735343 | | * | 4/2021 | G09G 3/3406 |
| CN | 112735343 | A | | 4/2021 | |
| JP | H03182793 | A | | 8/1991 | |
| JP | 2001013902 | A | | 1/2001 | |
| JP | 2012137783 | A | | 7/2012 | |

* cited by examiner

DIMMING METHOD AND DEVICE OF DISPLAY PANEL, STORAGE MEDIUM, AND TERMINAL EQUIPMENT

CROSS REFERENCE TO RELATED APPLICATIONS

This application is a National Phase of PCT Patent Application No. PCT/CN2022/082023 having International filing date of Mar. 21, 2022, which claims the benefit of priority of Chinese Patent Application No. 202210170470.7, filed Feb. 24, 2022, the contents of which are all incorporated herein by reference in their entirety.

BACKGROUND OF INVENTION

Field of Invention

The present disclosure relates to a technology field of a display panel, and particular to a dimming method and device of a display panel, a storage medium, and a terminal equipment.

Description of Prior Art

There are two main current dimming methods. The first one is a pulse width modulation (PWM) dimming method. This dimming principle realizes different brightness by changing a duty cycle of conduction to make conduction conditions be different within one frame. When low grayscale is displayed, it has advantages of constant output amplitudes, good color consistency, high luminous efficiency of light emitting diodes (LED), and more accurate reality of low grayscale. However, strobes visible to human eyes are easily generated. The second one is direct current (DC) dimming method. In this principle, brightness is directly controlled by controlling output power (current or voltage). It has an advantage of no strobe, but has a disadvantage of poor color consistency, incurred by a current flowing through the LEDs becoming smaller, and low luminous efficiency of the LEDs, when the low grayscale is displayed.

According to the principle of PWM dimming, in a light-emitting stage of one frame, a high duty cycle corresponds to high brightness. Taking 8 bit grayscales as an example, 256 kinds of duty cycles need to be segmented in the light-emitting stage of one frame. Furthermore, taking a lower refresh rate of 60 HZ as an example, a time of one frame is 16.67 ms, and in theory, 256 different duty cycles are segmented within a time not exceeding 16.67 ms. A time of averagely segmenting each grayscale is 65 μs, but segmentation of the grayscale cannot be simply segmented linearly, it needs to be performed as a nonlinear segmentation to match with a gamma 2.2 curve conforming to human eye characteristics. A finer duty cycle segmentation is required at low grayscales than at high grayscales. Furthermore, as the N-type transistor has its own minimum turning-on limit (generally 6.7 μs), more accurate low grayscale display and future development trends of high refresh rates and high grayscale number (10 bit) are difficult to meet. Moreover, the reliability of PWM dimming method at low grayscales is significantly better than that of the DC dimming method.

When the brightness at the low grayscale is adjusted by the DC dimming method, power of each grayscale needs to be segmented very accurately. Therefore, requirements for current or voltage ripple are very high, which makes technology development be difficult.

The technical problem is a problem of low control accuracy of low grayscales by using the PWM dimming and DC dimming currently.

SUMMARY OF INVENTION

According to one aspect of the present invention, the present invention provides a dimming method of a display panel. The method includes: obtaining a grayscale value of a pending displayed frame, and determining a light-emitting stage of the display panel; determining a light-emitting signal and a control signal according to the grayscale value of the pending displayed frame, when the light-emitting stage is a first dimming stage; and controlling the display panel to emit light by superposing the control signal in the light-emitting signal.

Furthermore, the method further includes: determining the light-emitting signal according to the grayscale value of the pending displayed frame, when the light-emitting stage is a second dimming stage; and controlling the display panel to emit light by the light-emitting signal.

Furthermore, determining the light-emitting signal according to the grayscale value of the pending displayed frame includes: generating the dimming signal according to the grayscale value of the pending displayed frame to control input of the light-emitting signal.

Furthermore, the control signal and the light-emitting signal are synchronously inputted, a frequency of the control signal and a frequency of the dimming signal are same, an amplitude of the control signal is less than an amplitude of the light-emitting signal, and a polarity of the amplitude of the control signal is opposite to a polarity of the amplitude of the light-emitting signal.

Furthermore, a display grayscale value of the display panel is controlled according to a duty cycle of the dimming signal and an amplitude of the control signal in the first dimming stage; or the display grayscale value of the display panel is controlled according to the amplitude of the control signal in the first dimming stage.

Furthermore, a grayscale value of the display panel is controlled according to a duty cycle of the dimming signal in the second dimming stage.

Furthermore, the first dimming stage the grayscale value of the pending displayed frame is a light-emitting stage when the grayscale value of the pending displayed frame does not exceed 10% of a maximum grayscale value of the display panel; and the second dimming stage is a light-emitting stage when the grayscale value of the pending displayed frame exceeds 10% of the maximum grayscale value of the display panel.

According to another aspect of the present invention, the present invention provides a dimming device of the display panel. The device includes: an input unit configured to input a light-emitting signal; a dimming unit configured to generate a dimming signal according to a grayscale value of a pending displayed frame to control input of the light-emitting signal; a low grayscale control unit configured to generate a control signal according to the grayscale value of the pending displayed frame and to superpose the control signal to the light signal in a first dimming stage; and a light-emitting unit configured to control the display panel to emit light according to a superposed light-emitting signal.

According to another aspect of the present invention, the present invention provides a storage medium. A computer program is stored in the storage medium. When the computer program is operated in a computer, the computer is allowed to execute to obtain a grayscale value of a pending displayed frame and to determine a light-emitting stage of the display panel; to determine a light-emitting signal and a control signal according to the grayscale value of the pending displayed frame, when the light-emitting stage is a first dimming stage; and to control the display panel to emit light by superposing the control signal in the light-emitting signal.

Furthermore, the light-emitting signal is determined according to the grayscale value of the pending displayed frame, when the light-emitting stage is a second dimming stage; and the display panel is controlled to emit light by the light-emitting signal.

Furthermore, determining the light-emitting signal according to the grayscale value of the pending displayed frame includes: generating the dimming signal according to the grayscale value of the pending displayed frame to control input of the light-emitting signal.

Furthermore, the control signal and the light-emitting signal are synchronously inputted, a frequency of the control signal and a frequency of the dimming signal are same, an amplitude of the control signal is less than an amplitude of the light-emitting signal, and a polarity of the amplitude of the control signal is opposite to a polarity of the amplitude of the light-emitting signal.

Furthermore, a display grayscale value of the display panel is controlled according to a duty cycle of the dimming signal and an amplitude of the control signal in the first dimming stage; or the display grayscale value of the display panel is controlled according to the amplitude of the control signal in the first dimming stage.

Furthermore, a grayscale value of the display panel is controlled according to a duty cycle of the dimming signal in the second dimming stage.

Furthermore, the first dimming stage the grayscale value of the pending displayed frame is a light-emitting stage when the grayscale value of the pending displayed frame does not exceed 10% of a maximum grayscale value of the display panel; and the second dimming stage is a light-emitting stage when the grayscale value of the pending displayed frame exceeds 10% of the maximum grayscale value of the display panel.

According to another aspect of the present invention, the present invention provides a terminal equipment including a processor and a memory. The processor is electrically connected to the memory, the memory is configured to store instructions and data, and the processor is configured to execute steps in the dimming method of the display panel of any embodiment of the present invention The advantage of the present invention is that in a second dimming stage in a frame of an image, a grayscale of a light-emitting stage of the display is controlled by the light-emitting signal; and in a first dimming stage in the frame of the image, the grayscale of the light-emitting stage of the display panel is controlled by superposing a control signal in the light-emitting signal. Therefore, in a low grayscale, the grayscale is realized by reducing an amplitude of the light-emitting signal.

DESCRIPTION OF DRAWINGS

To more clearly illustrate embodiments or the technical solutions of the present disclosure, the accompanying figures of the present disclosure required for illustrating embodiments or the technical solutions of the present disclosure will be described in brief. Obviously, the accompanying figures described below are only part of the embodiments of the present disclosure, from which those skilled in the art can derive further figures without making any inventive efforts.

DETAILED DESCRIPTION OF EMBODIMENTS

The technical solutions in the embodiments of the present invention are clearly and completely described in the following with reference to the accompanying drawings in the embodiments of the present invention. Obviously, the described embodiments are only part of the embodiments of the present invention, but are not all embodiments of the present invention. All other embodiments obtained by those skilled in the art based on the embodiments of the present invention without creative efforts are within the scope of the present invention.

In the description of the present invention, unless specified or limited otherwise, terms "mounted," "connected," "coupled," and the like are used in a broad sense, and may include, for example, fixed connections, detachable connections, or integral connections; may also be mechanical or electrical connections or may be communication between each other; may also be direct connections or indirect connections via intervening structures; may also be inner communications of two elements or may be a relationship of interaction between two elements. For persons skilled in the art in this field, the specific meanings of the above terms in the present invention can be understood with specific cases.

Figure 1A:
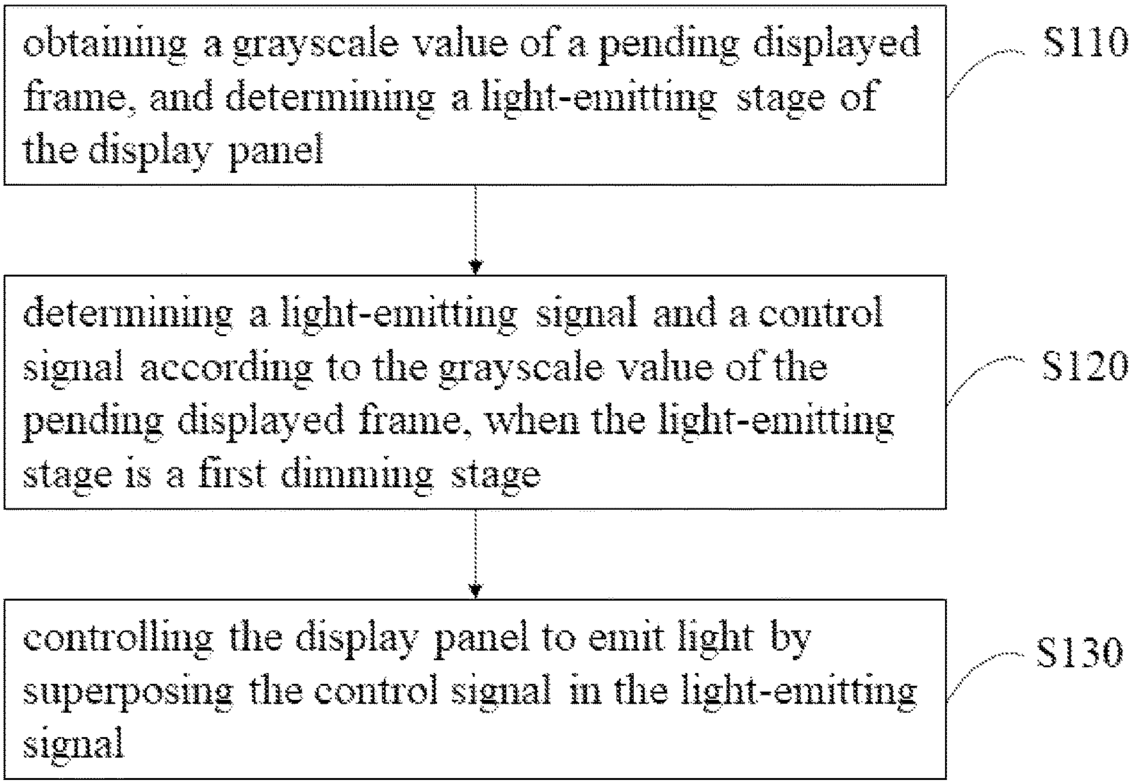
FIG. 1*a* is a flowchart of a dimming method of a display panel provided by one embodiment of the present invention.
Figure 1B:
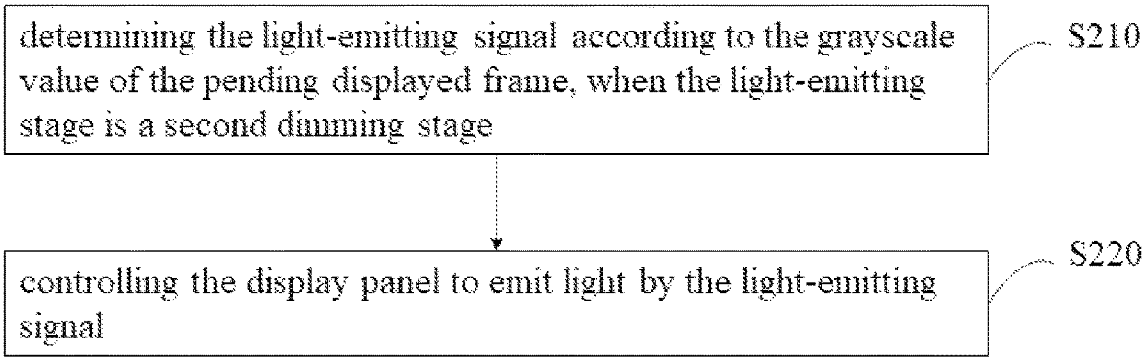
FIG. 1*b* is a flowchart of the dimming method of the display panel provided by one embodiment of the present invention.

Illustrated in FIG. 1*a* and FIG. 1*b* are flowcharts of a dimming method of a display panel provided by one embodiment of the present invention. The method includes:

Step 110: obtaining a grayscale value of a pending displayed frame, and determining a light-emitting stage of the display panel.

Step S120: determining a light-emitting signal and a control signal according to the grayscale value of the pending displayed frame, when the light-emitting stage is a first dimming stage.

Step S130: controlling the display panel to emit light by superposing the control signal in the light-emitting signal.

Step S210: determining the light-emitting signal according to the grayscale value of the pending displayed frame, when the light-emitting stage is a second dimming stage.

Step S220: controlling the display panel to emit light by the light-emitting signal.

In this embodiment, the light-emitting stage includes the second dimming stage and the first dimming stage.

Optionally, the second dimming stage is that the grayscale value currently displayed exceeds 10% of the maximum grayscale value of the display panel. The first dimming stage is that the grayscale value currently displayed does not exceed 10% of the maximum grayscale value of the display panel. For example, taking 8 bit grayscales as an example, 256 kind of duty cycles need to be segmented in the light-emitting stage of one frame. Furthermore, taking a lower refresh rate of 60 HZ as an example, a time of one frame is 16.67 ms, and in theory, 256 different duty cycles are segmented within a time not exceeding 16.67 ms. In this way, the grayscale values of 27-256 grayscales can be used in the second dimming stage, and the grayscale values of 0-26 grayscales can be used in the first dimming stage. It can be understood that the grayscale values of the pending displayed frame corresponding to the first dimming stage and the second dimming stage can be determined according to requirements. For example, the first dimming stage is a light-emitting stage that the grayscale value of the pending displayed frame does not exceed 15% of the maximum grayscale value of the display panel; and the second dimming stage is a light-emitting stage of the grayscale value of the pending displayed frame greater than 15% of the maximum grayscale value of the display panel. Exemplarily, a delivery point of the grayscale values of the first dimming stage and the second dimming stage can range from 8% to 21% of the maximum grayscale value of the display panel.

Exemplarily, the light-emitting signal is generated from the dimming signal, and the dimming signal is a pulse width modulation (PWM) signal. The control signal and the light-emitting signal are synchronously inputted. A frequency of the control signal and a frequency of the dimming signal are same. An amplitude of the control signal is less than an amplitude of the light-emitting signal, and a polarity of the amplitude of the control signal is opposite to a polarity of the amplitude of the light-emitting signal.

Exemplarily, a grayscale value of the display panel is controlled according to a duty cycle of the dimming signal in the second dimming stage. The grayscale value of the display panel in the light-emitting stage is controlled according to a duty cycle of the dimming signal and an amplitude of the control signal in the first dimming stage; or the grayscale value of the display panel in the light-emitting stage is controlled according to the amplitude of the control signal in the first dimming stage.

Of course, in other embodiments, as input of the light-emitting signal is controlled and generated by the dimming signal, for example, the input duty cycle of the light-emitting signal is controlled by the dimming signal through turning-on or turning-off of various switches in switch units, the grayscale of the light-emitting stage can be changed by changing the input amplitude of the light-emitting signal in a condition that the input duty cycle of the light-emitting signal remains unchanged, Furthermore, as the amplitude of the light-emitting signal is determined by the received light-emitting signal, when the grayscale is low, i.e., in the first dimming stage, a required amplitude is small and is difficult to control. Therefore, when the first dimming stage and the second dimming stage are divided, the amplitude of the light-emitting signal is greater than a preset value in the second dimming stage, and the amplitude of the light-emitting signal does not exceed a preset value in the first dimming stage. That is, the amplitude of the light-emitting signal can act as the delivery point. The delivery point can be determined according to work performance of elements in the display panel. For example, when the amplitude is greater than 1 volt, fluctuation of a current or a voltage is small, then in the second dimming stage, the amplitude can be greater than 1 volt, and in the first dimming stage, the amplitude can be less than or equal to 1 volt.

In a second dimming stage in a frame of one frame of an image, a grayscale of a light-emitting stage of the display is controlled by the light-emitting signal. In a first dimming stage in the frame of the image, the grayscale of the light-emitting stage of the display panel is controlled by superposing a control signal in the light-emitting signal. Therefore, in a low grayscale, the grayscale is realized by reducing an amplitude of the light-emitting signal.

Figure 2:
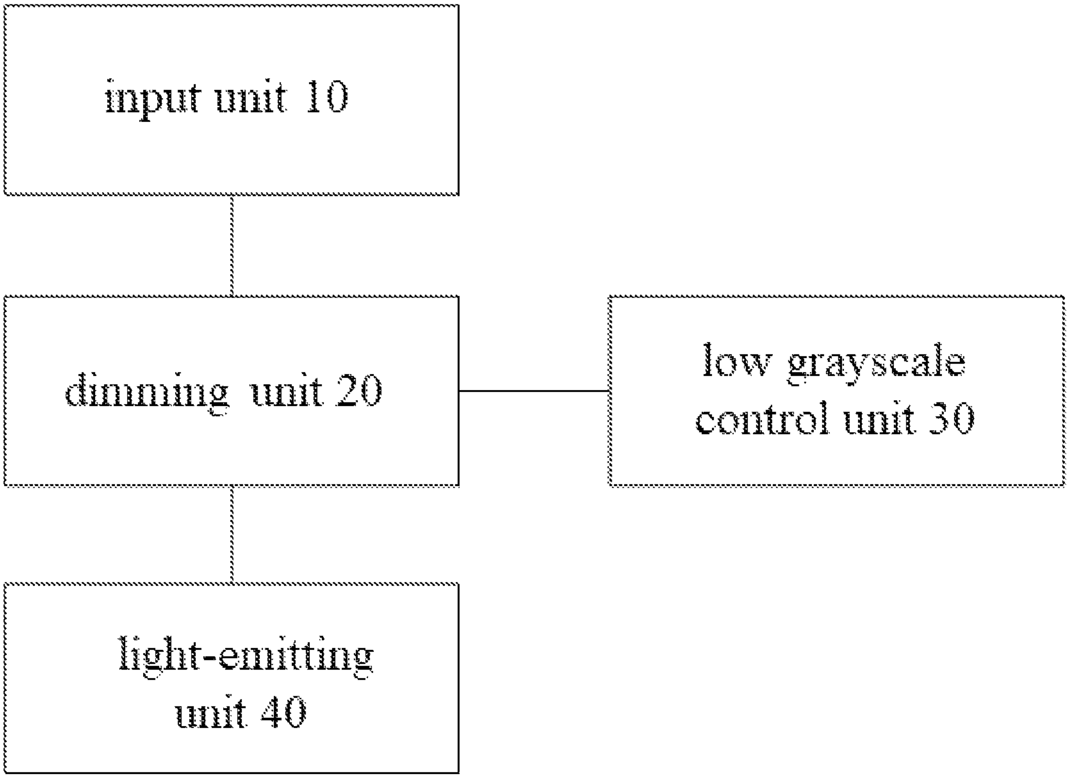
FIG. 2 is a structural schematic diagram of a dimming device of the display panel provided by one embodiment of the present invention.

Illustrated in FIG. 2 is a structural schematic diagram of a dimming device of the display panel provided by one embodiment of the present invention. The device includes an input unit 10, a dimming unit 20, a low grayscale control unit 30, and a light-emitting unit 40.

The input unit is configured to input the light-emitting signal. The dimming unit is configured to generate the dimming signal according to the grayscale value of the pending displayed frame to control input of the light-emitting signal. The low grayscale control unit is configured to generate the control signal according to the grayscale value of the pending displayed frame and to superpose the control signal to the light signal in the first dimming stage. The light-emitting unit is configured to control the display panel to emit light according to a superposed light-emitting signal.

In this embodiment, the light-emitting stage includes the second dimming stage and the first dimming stage.

Optionally, the second dimming stage is that the grayscale value currently displayed exceeds 10% of the maximum grayscale value of the display panel. The first dimming stage is that the grayscale value currently displayed does not exceed 10% of the maximum grayscale value of the display panel. For example, taking 8 bit grayscales as an example, 256 kind of duty cycles need to be segmented in the light-emitting stage of one frame. Furthermore, taking a lower refresh rate of 60 HZ as an example, a time of one frame is 16.67 ms, and in theory, 256 different duty cycles are segmented within a time not exceeding 16.67 ms. In this way, the grayscale values of 27-256 grayscales can be used in the second dimming stage, and the grayscale values of 0-26 grayscales can be used in the first dimming stage. It can be understood that the grayscale values of the pending displayed frame corresponding to the first dimming stage and the second dimming stage can be determined according to requirements. For example, the first dimming stage is a light-emitting stage that the grayscale value of the pending displayed frame does not exceed 15% of the maximum grayscale value of the display panel; and the second dimming stage is a light-emitting stage of the grayscale value of the pending displayed frame greater than 15% of the maximum grayscale value of the display panel. Exemplarily, a delivery point of the grayscale values of the first dimming stage and the second dimming stage can range from 8% to 21% of the maximum grayscale value of the display panel.

Exemplarily, the light-emitting signal is generated from the dimming signal, and the dimming signal is a pulse width modulation (PWM) signal. The control signal and the light-emitting signal are synchronously inputted. A frequency of the control signal and a frequency of the dimming signal are same. An amplitude of the control signal is less than an amplitude of the light-emitting signal, and a polarity of the amplitude of the control signal is opposite to a polarity of the amplitude of the light-emitting signal.

Exemplarily, a grayscale value of the display panel is controlled according to a duty cycle of the dimming signal in the second dimming stage. The grayscale value of the display panel in the light-emitting stage is controlled according to a duty cycle of the dimming signal and an amplitude of the control signal in the first dimming stage; or the grayscale value of the display panel in the light-emitting stage is controlled according to the amplitude of the control signal in the first dimming stage.

Of course, in other embodiments, as input of the light-emitting signal is controlled and generated by the dimming signal, for example, the input duty cycle of the light-emitting signal is controlled by the dimming signal through turning-on or turning-off of various switches in switch units, the grayscale of the light-emitting stage can be changed by changing the input amplitude of the light-emitting signal in a condition that the input duty cycle of the light-emitting signal remains unchanged, Furthermore, as the amplitude of the light-emitting signal is determined by the received light-emitting signal, when the grayscale is low, i.e., in the first dimming stage, a required amplitude is small and is difficult to control. Therefore, when the first dimming stage and the second dimming stage are divided, the amplitude of the light-emitting signal is greater than a preset value in the second dimming stage, and the amplitude of the light-emitting signal does not exceed a preset value in the second dimming stage. That is, the amplitude of the light-emitting signal can act as the delivery point. The delivery point can be determined according to work performance of elements in the display panel. For example, when the amplitude is greater than 1 volt, fluctuation of a current or a voltage is small, then in the second dimming stage, the amplitude can be greater than 1 volt, and in the first dimming stage, the amplitude can be less than or equal to 1 volt.

Figure 5:
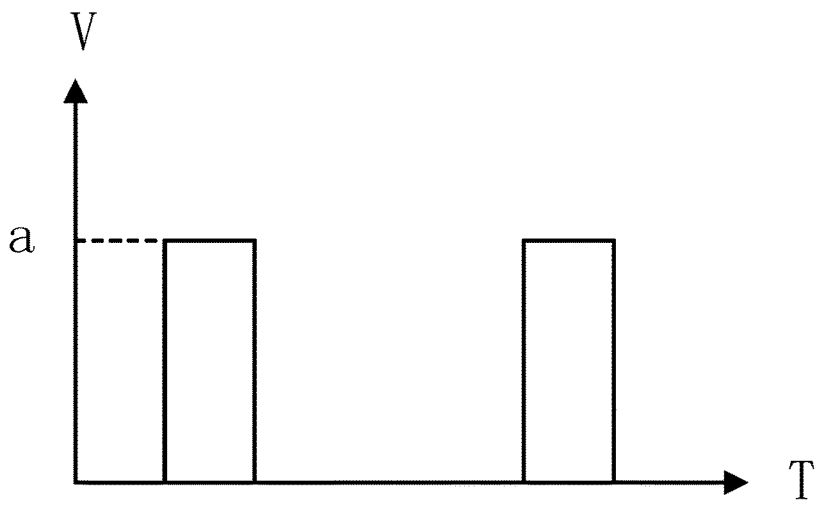
FIG. 5 is as sequence diagram of a light-emitting signal of one embodiment of the present invention.
Figure 6:
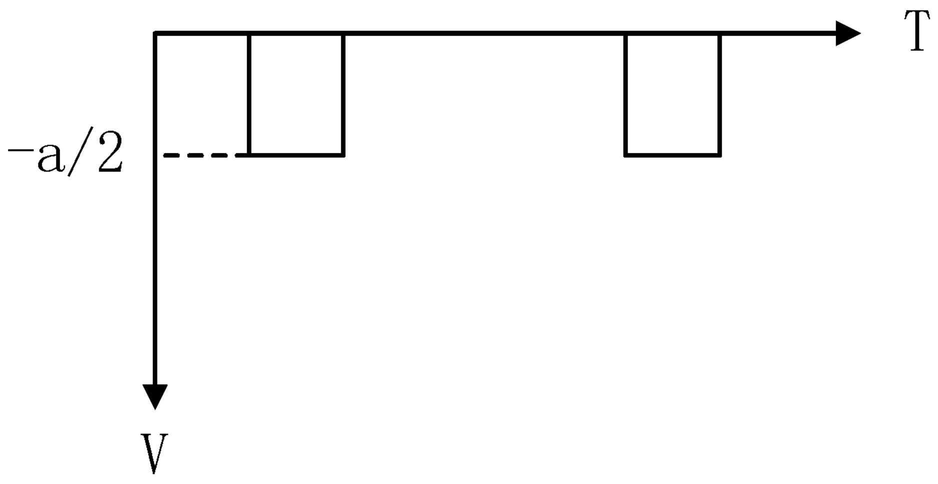
FIG. 6 is a sequence diagram of a control signal of one embodiment of the present invention.
Figure 7:
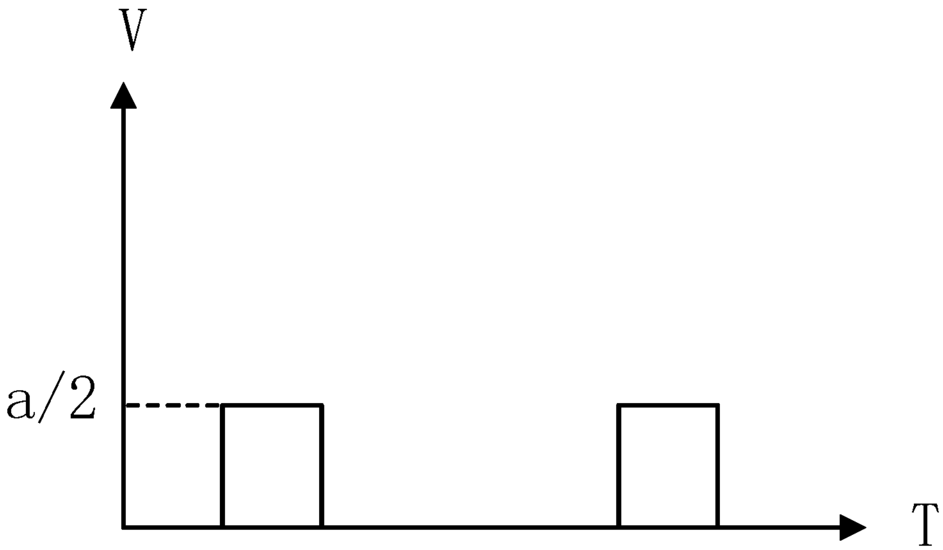
FIG. 7 is a sequence diagram of a superposed light-emitting signal of one embodiment of the present invention.

Exemplarily, please combine and refer to FIG. 5, FIG. 6, and FIG. 7. An amplitude of the light-emitting signal is a. An amplitude of the control signal is −a/2. An amplitude of the superimposed light-emitting signal is a/2. As amplitudes are reduced, lower grayscale display can be realized in a situation of a same duty cycle. Corresponding to another low grayscale, the amplitude of the light-emitting signal is a, the amplitude of the control signal is −a/3, and the amplitude of the superimposed light-emitting signal is 2a/3. It can be understood that, according to specific requirements for grayscales, the amplitudes of the superimposed light-emitting signal can be controlled by simultaneously controlling the amplitudes of the light-emitting signal and the control signal, or by controlling the amplitudes of the light-emitting signal and the control signal respectively, thereby realizing display of different grayscales.

In a second dimming stage in a frame of one frame of an image, a grayscale of a light-emitting stage of the display is controlled by the light-emitting signal. In a first dimming stage in the frame of the image, the grayscale of the light-emitting stage of the display panel is controlled by superposing a control signal in the light-emitting signal. Therefore, in a low grayscale, the grayscale is realized by reducing an amplitude of the light-emitting signal.

Figure 3:
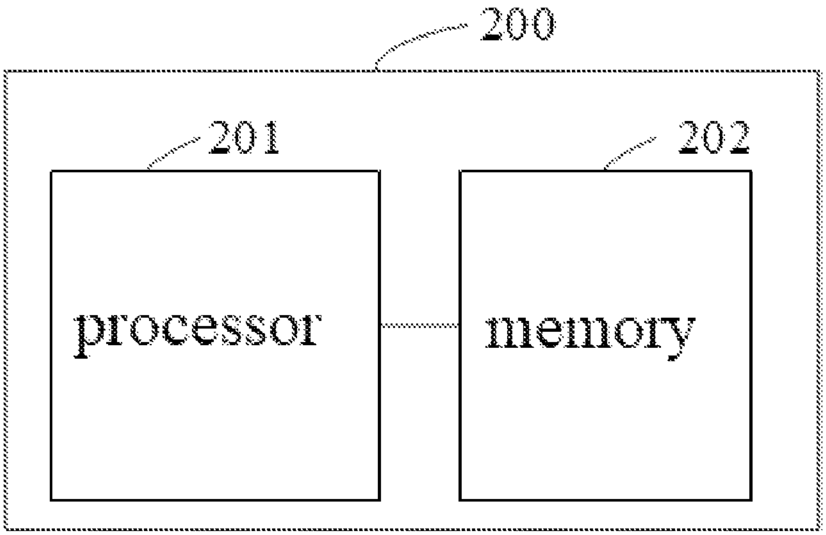
FIG. 3 is a structural schematic diagram of a terminal equipment provided by one embodiment of the present invention.

In addition, one embodiment on the present invention further provides a terminal equipment. The terminal equipment can be equipment such as a smart phone, a tablet PC, etc. Specifically, as illustrated in FIG. 3, the terminal equipment 200 includes a processor 201 and a memory 202. Wherein, the processor 201 is electrically connected to the memory 202.

The processor 201 is a control center of the terminal equipment 200, is connected to each part of the entire terminal equipment by using various interfaces and lines, and performs various functions of the terminal equipment and processes data by running or executing software programs stored in the memory 202 and invoking data stored in the memory 202, thereby monitoring the terminal equipment entirely.

In this embodiment, a plurality of storage partitions are provided in the terminal equipment 200. The plurality of storage partitions include system partitions and target partitions. The processor 201 of the terminal equipment 200 loads instructions corresponding to one or more processes of application programs to the memory 202, and the processor 201 runs the application program stored in the memory 202 to realize various functions as follows:

obtaining a grayscale value of a pending displayed frame, and determining a light-emitting stage of the display panel;

determining a light-emitting signal and a control signal according to the grayscale value of the pending displayed frame, when the light-emitting stage is a first dimming stage; and controlling the display panel to emit light by superposing the control signal in the light-emitting signal.

Figure 4:
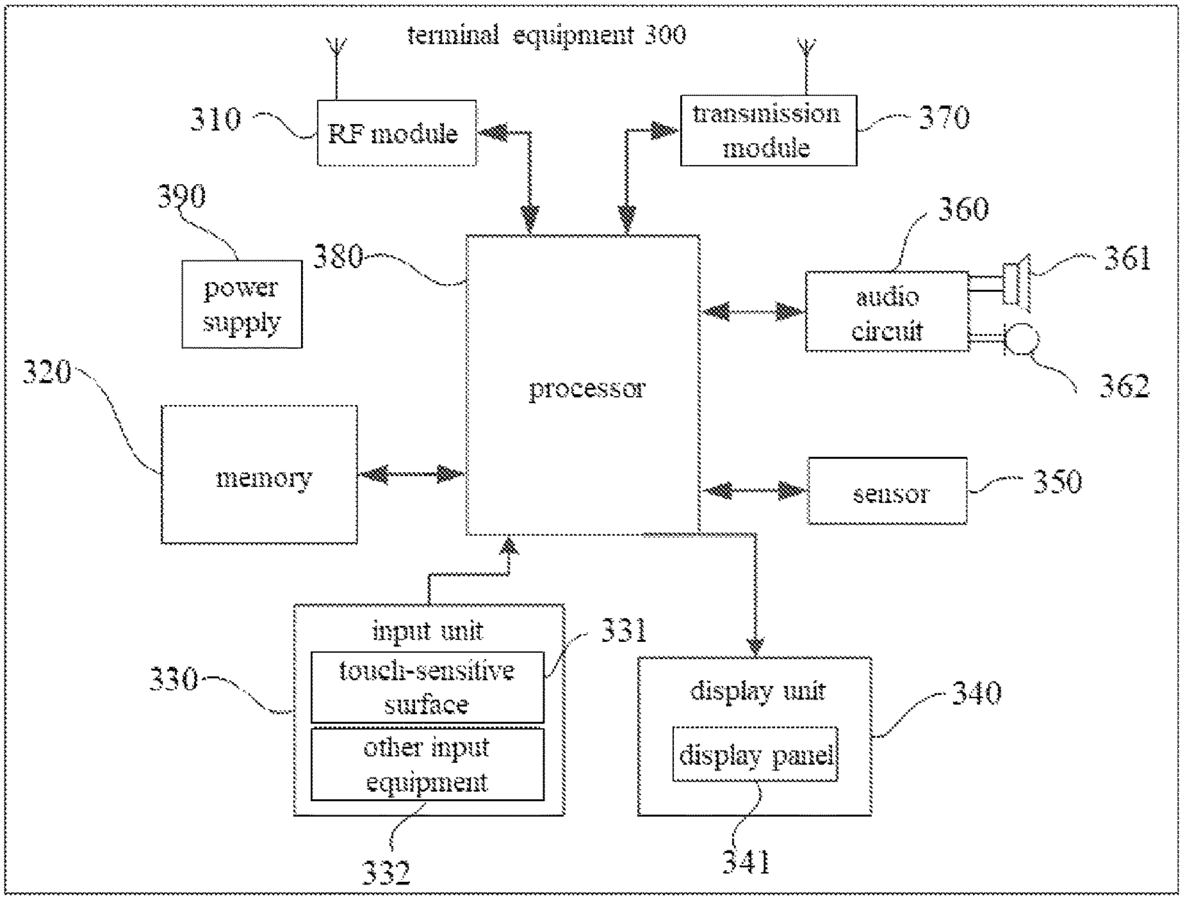
FIG. 4 is a structural schematic diagram of the terminal equipment provided by one embodiment of the present invention.

A specific structural block diagram of the terminal equipment provided by one equipment of the present application is illustrated in FIG. 4. The terminal equipment can be used to implement the dimming method of the display panel provided in the aforesaid embodiments. The terminal equipment 300 can be a smart phone or a tablet PC. In addition, the terminal equipment can further include following parts.

A (radio frequency) RF module 110, which is configured to receive and send electromagnetic signals, and realizing conversion between the electromagnetic signals and electric signals, thereby communicating with a communicating network or other equipment. The RF module 310 can includes various current circuit elements for communication, such as an antenna, an RF transceiver, a digit signal processor, an encryption/decryption chip, a subscriber identity module (SIM) card, a memory, etc. The RF module 310 can communicate with various networks, such as the Internet, an enterprise intranet, or a wireless network, or communicate with other devices via the wireless network. The aforesaid wireless network can be a cellular phone network, a wireless local-area network (WLAN), or a metropolitan area network (MAN).

The memory 320 can store software programs and modules, such as program instructions/modules corresponding to the dimming method of the display panel in the aforesaid embodiments. The processor 380 runs the software programs and the modules stored in the memory 320 to perform various functional applications and process data, i.e., realizes a dimming function of the display panel. The storage memory 320 can include high-speed random access memories, and can also include non-volatile memory, e.g. at least one or a plurality of disks storage device, flash memory devices, or other volatile solid state memory devices. In some embodiments, the memory 320 can further include memories remotely disposed from the processor 380. These remote memories can be connected to the terminal equipment 300 through a network. Embodiments of the aforesaid network include, but are not limited to, the Internet, an enterprise intranet, a local area network, a mobile communications network, and a combination thereof.

The input unit 330 can be used for receiving entered information of numbers or characters, and for generating keyboard, mouse, joystick and optical or trackball signal input related to user settings and functions control. Specifically, the input unit 330 can include a touch-sensitive surface 331 and other input equipment 332. The touch-sensitive surface 331, also known as a touch screen or a touch panel, which can collect touch operation performed by a user, e.g., operation of the user using fingers, a stylus or any proper objects or accessory on the touch-sensitive surface 331 or where adjacent to the touch-sensitive surface 331, and the touch-sensitive surface 331 drives corresponding connected devices according to a preset procedure. Optionally, the touch-sensitive surface 331 can include two parts of a touch detection device and a touch controller. Wherein, the touch detection device detects a touching location of the user, detects a signal from the touch operation, and transmits the signal to the touch controller. The touch controller receives touch information from the touch detection device and converts it into touch point coordinates, then sends the coordinates to the processor 380. The touch controller also can receive a command sent from the processor 380 and execute it. Moreover, the touch-sensitive surface 131 can be realized by using a touch-sensitive surface of a resistor type, a capacitor type, infrared ray, surface acoustic wave, or many other types. In addition to the touch-sensitive surface 331, the input unit 330 can further include other input equipment 332. Specifically, other input equipment 332 can include but is not limited to one or more of a physical keyboard, a functional button (e.g. a volume control button, a switch button etc.), a track ball, a mouse, a joystick, etc.

The display unit 340 can be configured to display information inputted by the user, provided to the user, and various graphical user interfaces of the terminal equipment 300. These graphical user interfaces can be composed of graphics, texts, icons, videos, and combinations thereof. The display unit 340 can include a display panel 341. Optionally, the display panel 341 can be configured in a form of a liquid crystal display (LCD), organic light-emitting diodes (OLEDs), etc. Furthermore, the touch-sensitive surface 331 can cover the display panel 341. After the touch-sensitive surface 331 detects touch operations on it or nearby, they are transmitted to the processor 380 to determine a type of the touch event. Afterwards, according to the type of the touch event, the processor 380 provides corresponding visual output on the display panel 341. Obviously, in FIG. 4, the touch-sensitive surface 331 and the display panel 341 realize the input and output functions as two independent components. However, in some embodiments, the touch-sensitive surface 331 and the display panel 341 can be integrated to realize the input and output functions.

The terminal equipment 300 can also include at least one sensor 350, e.g., an optical sensor, a motion sensor, and other sensors. Specifically, the optical sensor can include an ambient light sensor and a proximity sensor. Wherein, the ambient light sensor can adjust brightness of the display panel 341 according to brightness of the ambient light, and the proximity sensor can turn off the display panel 341 and/or a backlight when the terminal equipment 300 is moved to an ear. A gravity acceleration sensor is a motion sensor, which detects a magnitude of acceleration in all directions (generally triaxial), detects the magnitude and direction of the gravity when it is stationary, and can be configured to recognize an application of a mobile phone posture (e.g. switch between a horizontal screen and a vertical screen, related games and magnetometer posture calibration) and vibration recognition related functions (e.g., pedometers and percussions), etc. Regarding the terminal equipment 300, a gyroscope, a barometer, a hygrometer, a thermometer, an infrared sensor, and other sensors can also be disposed, and redundant description will not be mentioned herein again.

An audio circuit 360, a speaker 361, and a microphone 362 can provide an audio interface between a user and the terminal equipment 300. The audio circuit 360 can convert receives received audio data into an electrical signal and transmits the sound signal to the speaker 361. The speaker 361 converts the electrical signal into a sound signal and output the sound signal. On the other hand, the speaker 362 converts the collected sound signal into an electrical signal, which is converted into audio data after received by the audio circuit 360. Then, after the audio data is sent to the processor 380 and processed by the processor 380, through the RF circuit 310, the audio data is sent to e.g., another terminal, or the audio data is outputted to the memory 320 for further processing. The audio circuit 360 can further include an earplug jack, so as to provide communication between a peripheral earphone and the terminal equipment 300.

The terminal equipment 300 can help the user to send and receive an email, browse a web page, access streaming media, etc., by a transmission module 370, e.g., a Wi-Fi module, which provides wireless broadband Internet access for the user. Although the transmission module 370 is illustrated in FIG. 4, it can be understood that the transmission module 370 is not a necessary part of the terminal equipment 300, which can be completely omitted as required without changing a scope of the essence of the present invention.

The processor 380 is a control center of the terminal equipment 300, is connected to each part of the entire terminal equipment by using various interfaces and lines, and executes various functions of the terminal equipment 300 and processes data by running or executing the software program and/or module stored in the memory 320 and invoking data stored in the memory 320, thereby performing overall monitoring on the terminal equipment. Optionally, the processor 380 can include one or more processing units. In some embodiments, an application processor and a modem processor can be integrated into the processor 380. Wherein, the application processor is mainly for processing an operating system, a user interface, application programs, etc., and the modem processor is mainly for processing wireless communication. It can be understood that the aforesaid modem processor can also not be integrated into the processor 380.

The terminal equipment 300 further include a power supply 390 supplying powers to various component. In some embodiments, the power supply can realize functions such as charging, discharging and power consumption management by logically connected to the processor 380 through a power supply management system. The power supply 390 can further include one or more arbitrary components such as a DC power supply or an AC power supply, a recharging system, a power supply failure detection circuit, a power supply converter or inverter, a power supply status indicator, etc.

Although not illustrated, the terminal equipment 300 can further include cameras, e.g., a front camera, or a rear camera, etc., and redundant description will not be mentioned herein again. Specifically, in this embodiment, the display unit of the terminal equipment is a touch-screen display device. The terminal equipment further includes a memory and one or more than one of programs. Wherein, the one or more than one of the programs are stored in the memory and configured to be executed by one or more than one processors. The one or more than one of the programs include instructions for performing the following operations:

obtaining a grayscale value of a pending displayed frame, and determining a light-emitting stage of the display panel;

determining a light-emitting signal and a control signal according to the grayscale value of the pending displayed frame, when the light-emitting stage is a first dimming stage; and controlling the display panel to emit light by superposing the control signal in the light-emitting signal.

During a specific implementation, the aforesaid module can be implemented as a separate entity, or can be implemented in any combination, as the same or several entities. For the specific implementation of the aforesaid modules, can refer to the method embodiments mentioned above, and will not give unnecessary details herein.

It will be understood by those skilled in the art that all or a part of the steps of various method in the above embodiments may be completed by instructions or by controlling related hardware, in which the instructions may be stored in a computer readable medium and loaded and executed by the processor.

In this way, one embodiment of the present application provides a storage medium which stores a plurality of instructions. The instructions can be loaded by the processor to execute steps in any dimming method of the display panel provided by the embodiments of the present application.

Wherein, the storage medium can include a read only memory (ROM), a random access memory (RAM), a magnetic disk, or a disc, etc.

Because the instructions stored in the storage medium can perform steps in any dimming method of the display panel provided by the embodiments of the preset application, beneficial effects being able to be realized by any dimming method of the display panel provided by the embodiments of the present application can be achieved. The details can refer to the aforesaid embodiments, and redundant description will not be mentioned herein.

For the specific implementation of each operation the embodiments mentioned above can be referred to, and unnecessary details will not be given herein.

The display device provided by the embodiments of the present disclosure is described in detail. This article uses specific cases for describing the principles and the embodiments of the present disclosure, and the description of the embodiments mentioned above is only for helping to understand the method and the core idea of the present disclosure. Meanwhile, for those skilled in the art, will have various changes in specific embodiments and application scopes according to the idea of the present disclosure. In summary, the content of the specification should not be understood as limit to the present disclosure.

What is claimed is:

1. A dimming method of a display panel, comprising:

obtaining a grayscale value of a pending displayed frame, and determining a light-emitting stage of the display panel;

when the light-emitting stage is a first dimming stage, controlling the display panel to emit light by superposing a control signal in a light-emitting signal, wherein the light-emitting signal and the control signal are determined according to the grayscale value of the pending displayed frame; and when the light-emitting stage is a second dimming stage, controlling the display panel to emit light by the light-emitting signal, wherein the control signal and the light-emitting signal are synchronously inputted, a frequency of the control signal and a frequency of the light-emitting signal are same, an amplitude of the control signal is less than an amplitude of the light-emitting signal, and a polarity of the amplitude of the control signal is opposite to a polarity of the amplitude of the light-emitting signal, wherein the first dimming stage is a light-emitting stage when the grayscale value of the pending displayed frame does not exceed a grayscale threshold, the second dimming stage is a light-emitting stage when the grayscale value of the pending displayed frame exceeds the grayscale threshold, and the grayscale threshold is 8%-21% of a maximum grayscale value of the display panel.

2. The dimming method of the display panel as claimed in claim 1, wherein a dimming signal is generated according to the grayscale value of the pending displayed frame to control input of the light-emitting signal.

3. The dimming method of the display panel as claimed in claim 2, wherein controlling a display grayscale value of the display panel according to a duty cycle of the dimming signal and an amplitude of the control signal in the first dimming stage; or controlling the display grayscale value of the display panel according to the amplitude of the control signal in the first dimming stage.

4. The dimming method of the display panel as claimed in claim 2, wherein controlling a grayscale value of the display panel according to a duty cycle of the dimming signal in the second dimming stage.

5. The dimming method of the display panel as claimed in claim 1, wherein the first dimming stage is a light-emitting stage when the grayscale value of the pending displayed frame does not exceed 10% of the maximum grayscale value of the display panel; and the second dimming stage is a light-emitting stage when the grayscale value of the pending displayed frame exceeds 10% of the maximum grayscale value of the display panel.

6. A terminal equipment, comprising a processor and a memory, wherein the processor is electrically connected to the memory, the memory is configured to store instructions and data, and the processor is configured to execute steps in the dimming method of the display panel as claimed in claim 1.

7. The terminal equipment as claimed in claim 6, wherein a dimming signal is generated according to the grayscale value of the pending displayed frame to control input of the light-emitting signal.

8. The terminal equipment as claimed in claim 7, wherein controlling a display grayscale value of the display panel according to a duty cycle of the dimming signal and an amplitude of the control signal in the first dimming stage; or controlling the display grayscale value of the display panel according to the amplitude of the control signal in the first dimming stage.

9. The terminal equipment as claimed in claim 7, wherein controlling a grayscale value of the display panel according to a duty cycle of the dimming signal in the second dimming stage.

10. A dimming device of a display panel, comprising:

an input unit configured to input a light-emitting signal determined according to a grayscale value of a pending displayed frame;

a low grayscale control unit configured to generate a control signal according to the grayscale value of the pending displayed frame when a light-emitting stage of the display panel is a first dimming stage; and a light-emitting unit configured to control the display panel to emit light by superposing the control signal in the light-emitting signal when the light-emitting stage is the first dimming stage, and control the display panel to emit light by the light-emitting signal when the light-emitting stage is a second dimming stage, wherein the control signal and the light-emitting signal are synchronously inputted, a frequency of the control signal and a frequency of the light-emitting signal are same, an amplitude of the control signal is less than an amplitude of the light-emitting signal, and a polarity of the amplitude of the control signal is opposite to a polarity of the amplitude of the light-emitting signal, wherein the first dimming stage is a light-emitting stage when the grayscale value of the pending displayed frame does not exceed a grayscale threshold, the second dimming stage is a light-emitting stage when the grayscale value of the pending displayed frame exceeds the grayscale threshold, and the grayscale threshold is 8%-21% of a maximum grayscale value of the display panel.

11. A storage medium, wherein the storage medium stores a plurality of instructions executable by a processor to perform operations comprising:

obtaining a grayscale value of a pending displayed frame, and determining a light-emitting stage of the display panel;

when the light-emitting stage is a first dimming stage, controlling the display panel to emit light by superposing a control signal in a light-emitting signal, wherein the light-emitting signal and the control signal are determined according to the grayscale value of the pending displayed frame; and when the light-emitting stage is a second dimming stage, controlling the display panel to emit light by the light-emitting signal, wherein the control signal and the light-emitting signal are synchronously inputted, a frequency of the control signal and a frequency of the light-emitting signal are same, an amplitude of the control signal is less than an amplitude of the light-emitting signal, and a polarity of the amplitude of the control signal is opposite to a polarity of the amplitude of the light-emitting signal, wherein the first dimming stage is a light-emitting stage when the grayscale value of the pending displayed frame does not exceed a grayscale threshold, the second dimming stage is a light-emitting stage when the grayscale value of the pending displayed frame exceeds the grayscale threshold, and the grayscale threshold is 8%-21% of a maximum grayscale value of the display panel.

12. The storage medium as claimed in claim 11, wherein a dimming signal is generated according to the grayscale value of the pending displayed frame to control input of the light-emitting signal.

13. The storage medium as claimed in claim 12, wherein a display grayscale value of the display panel is controlled according to a duty cycle of the dimming signal and an amplitude of the control signal in the first dimming stage; or the display grayscale value of the display panel is controlled according to the amplitude of the control signal in the first dimming stage.

14. The storage medium as claimed in claim 12, wherein a grayscale value of the display panel is controlled according to a duty cycle of the dimming signal in the second dimming stage.

15. The storage medium as claimed in claim 12, wherein the first dimming stage is a light-emitting stage when the grayscale value of the pending displayed frame does not exceed 10% of the maximum grayscale value of the display panel; and the second dimming stage is a light-emitting stage when the grayscale value of the pending displayed frame exceeds 10% of the maximum grayscale value of the display panel.

* * * * *